(12) United States Patent
He et al.

(10) Patent No.: US 11,044,676 B2
(45) Date of Patent: Jun. 22, 2021

(54) POWER HEADROOM REPORT PROCEDURE FOR A WIRELESS NETWORK

(71) Applicant: QUALCOMM Incorporated, San Diego, CA (US)

(72) Inventors: Linhai He, San Diego, CA (US); Xiao Feng Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/554,145

(22) Filed: Aug. 28, 2019

(65) Prior Publication Data

US 2020/0107272 A1    Apr. 2, 2020

Related U.S. Application Data

(60) Provisional application No. 62/737,807, filed on Sep. 27, 2018.

(51) Int. Cl.

| | |
|---|---|
| *H04W 52/24* | (2009.01) |
| *H04W 52/32* | (2009.01) |
| *H04W 52/36* | (2009.01) |
| *H04W 72/14* | (2009.01) |
| *H04W 80/02* | (2009.01) |

(52) U.S. Cl.
CPC ....... *H04W 52/242* (2013.01); *H04W 52/325* (2013.01); *H04W 52/365* (2013.01); *H04W 72/14* (2013.01); *H04W 80/02* (2013.01)

(58) Field of Classification Search
CPC .. H04L 5/0053; H04L 5/0051; H04W 52/242; H04W 52/325; H04W 52/365; H04W 72/14; H04W 80/02; H04W 52/146
See application file for complete search history.

(56) References Cited

U.S. PATENT DOCUMENTS

| | | | |
|---|---|---|---|
| 2019/0253986 A1* | 8/2019 | Jeon | H04W 72/042 |
| 2019/0261280 A1* | 8/2019 | Jung | H04W 52/386 |

(Continued)

OTHER PUBLICATIONS

3rd Generation Partnership Project; Technical Specification Group Radio Access Network; NR; Medium Access Control (MAC) Protocol Specification (Release 15), 3GPP Draft; 38321-F30, 3rd Generation Partnership Project (3GPP), Mobile Competence Centre; 650, Route Des-Lucioles; F-06921 Sophia-Antipolis Cedex; France, Sep. 25, 2018, XP051477629, 76 Pages.

(Continued)

*Primary Examiner* — Benjamin H Elliott, IV
(74) *Attorney, Agent, or Firm* — Loza & Loza LLP

(57) ABSTRACT

Aspects of the disclosure relate to communication of power headroom reports in wireless communication networks. A user equipment (UE) may measure a path loss based on a triggering path loss reference signal (PL-RS) and trigger generation of a power headroom report (PHR) based on the path loss. The UE may identify uplink resources for communication of the PHR to a base station and determine whether the uplink resources are quasi-co-located with the triggering PL-RS. When the uplink resources are quasi-co-located with the triggering PL-RS, the user equipment may transmit the PHR utilizing the uplink resources. Otherwise, the UE may generate the PHR such that it includes information identifying the triggering PL-RS.

24 Claims, 12 Drawing Sheets

(56) References Cited

U.S. PATENT DOCUMENTS

2020/0100193 A1* 3/2020 Cheng ............... H04W 72/1268
2020/0107272 A1* 4/2020 He ........................ H04L 5/0053

OTHER PUBLICATIONS

3rd Generation Partnership Project; Technical Specification Group Radio Access Network; NR; Physical Layer Procedures for Control (Release 15), 3GPP Draft; 38213-F30, 3rd Generation Partnership Project (3GPP), Mobile Competence Centre; 650, Route Des Lucioles; F-06921 Sophia-Antipolis Cedex; France, Sep. 25, 2018, XP051515360, 101 pages.
International Search Report and Written Opinion—PCT/US2019/048754—ISA/EPO—dated Nov. 21, 2019.
Qualcomm Inc: "Correction to PHR with Multiple Path-loss Reference Signals", 3GPP Draft; 38321_CR0509_(REL-15)_R2_1815369_Correction to PHY MAC CE With Multiple Path-Loss Reference Signals, 3rd Generation Partnership Signals, 3rd Generation Partnership Project (3GPP), Mobile Competence Centre; 650, Route Des Lucioles, vol. RAN WG2, No. Chengdu, China; Oct. 8, 2018-Oct. 12, 2018, Sep. 28, 2018, XP051504355, 6 Pages.

* cited by examiner

POWER HEADROOM REPORT PROCEDURE FOR A WIRELESS NETWORK

PRIORITY CLAIM

This application claims priority to and the benefit of Provisional Patent Application No. 62/737,807, entitled "Transmitting a Power Headroom Report in New Radio," filed in the U.S. Patent and Trademark Office on Sep. 27, 2018, the entire contents of which are incorporated herein by reference as if fully set forth below in their entirety and for all applicable purposes

TECHNICAL FIELD

The technology discussed below relates generally to wireless communication systems, and more particularly, to a power headroom report procedure.

INTRODUCTION

In wireless networks, a user equipment (UE) may have a maximum transmission power limit defined by the UE power class. The UE may utilize the maximum transmission power limit to calculate a power headroom of the UE. For example, the power headroom may be calculated as the difference between the maximum transmission power limit and a current transmission power of the UE. The calculated power headroom may then be transmitted to a base station serving the UE within a power headroom report (PHR). Based on the PHR, the base station may recommend optimal transmission parameters, such as modulation and coding schemes, to the UE.

In some examples, the PHR may be triggered by various events. For example, the UE may be triggered to generate a PHR when a change in the path loss between the base station and the UE exceeds a threshold value. In this example, the path loss may be measured based on one or more path loss reference signals (PL-RS). After the PHR has been triggered based on the path loss change, the UE may include the PHR in the next available uplink (UL) transmission.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to communication of power headroom reports in wireless communication networks. A UE may measure a path loss based on a triggering PL-RS of a plurality of PL-RS and trigger generation of a PHR based on the measured path loss. The UE may further identify uplink resources for communication of the PHR to a base station and determine whether the uplink resources are quasi-co-located with the triggering PL-RS. When the uplink resources are quasi-co-located with the triggering PL-RS, the user equipment may transmit the PHR utilizing the uplink resources. Otherwise, the UE may generate the PHR such that it includes information associated with the triggering PL-RS. For example, the information associated with the triggering PL-RS may include an index of the triggering PL-RS. In addition, the information associated with the triggering PL-RS may include an index of a serving cell corresponding to the triggering PL-RS or a power headroom value corresponding to the triggering PL-RS.

In one example, a method of wireless communication at a scheduled entity is disclosed. The method includes measuring a path loss based on a triggering path loss reference signal (PL-RS) of a plurality of PL-RS, triggering generation of a power headroom report (PHR) based on the path loss, identifying uplink resources for communication of the PHR to a scheduling entity, and transmitting the PHR over the uplink resources, where the PHR indicates the triggering PL-RS that triggered the PHR.

In another example, a scheduled entity configured for wireless communication is disclosed. The scheduled entity includes a processor, a transceiver communicatively coupled to the processor, and a memory communicatively coupled to the processor. The processor is configured to measure a path loss based on a triggering path loss reference signal (PL-RS) of a plurality of PL-RS, trigger generation of a power headroom report (PHR) based on the path loss, identify uplink resources for communication of the PHR to a scheduling entity, and transmit the PHR over the uplink resources via the transceiver, where the PHR indicates the triggering PL-RS that triggered the PHR.

In another example, a method of wireless communication at a scheduling entity is disclosed. The method includes transmitting a plurality of path loss reference signals (PL-RS) including a triggering PL-RS to a user equipment (UE), scheduling uplink resources for use by the scheduling entity, and receiving a power headroom report (PHR) in response to the triggering PL-RS over the uplink resources, where the PHR indicates the triggering PL-RS.

In another example, a scheduling entity configured for wireless communication is disclosed. The scheduling entity includes a processor, a transceiver communicatively coupled to the processor, and a memory communicatively coupled to the processor. The processor is configured to transmit a plurality of path loss reference signals (PL-RS) including a triggering PL-RS to a user equipment (UE), schedule uplink resources for use by the scheduling entity, and receive a power headroom report (PHR) in response to the triggering PL-RS over the uplink resources, where the PHR indicates the triggering PL-RS.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
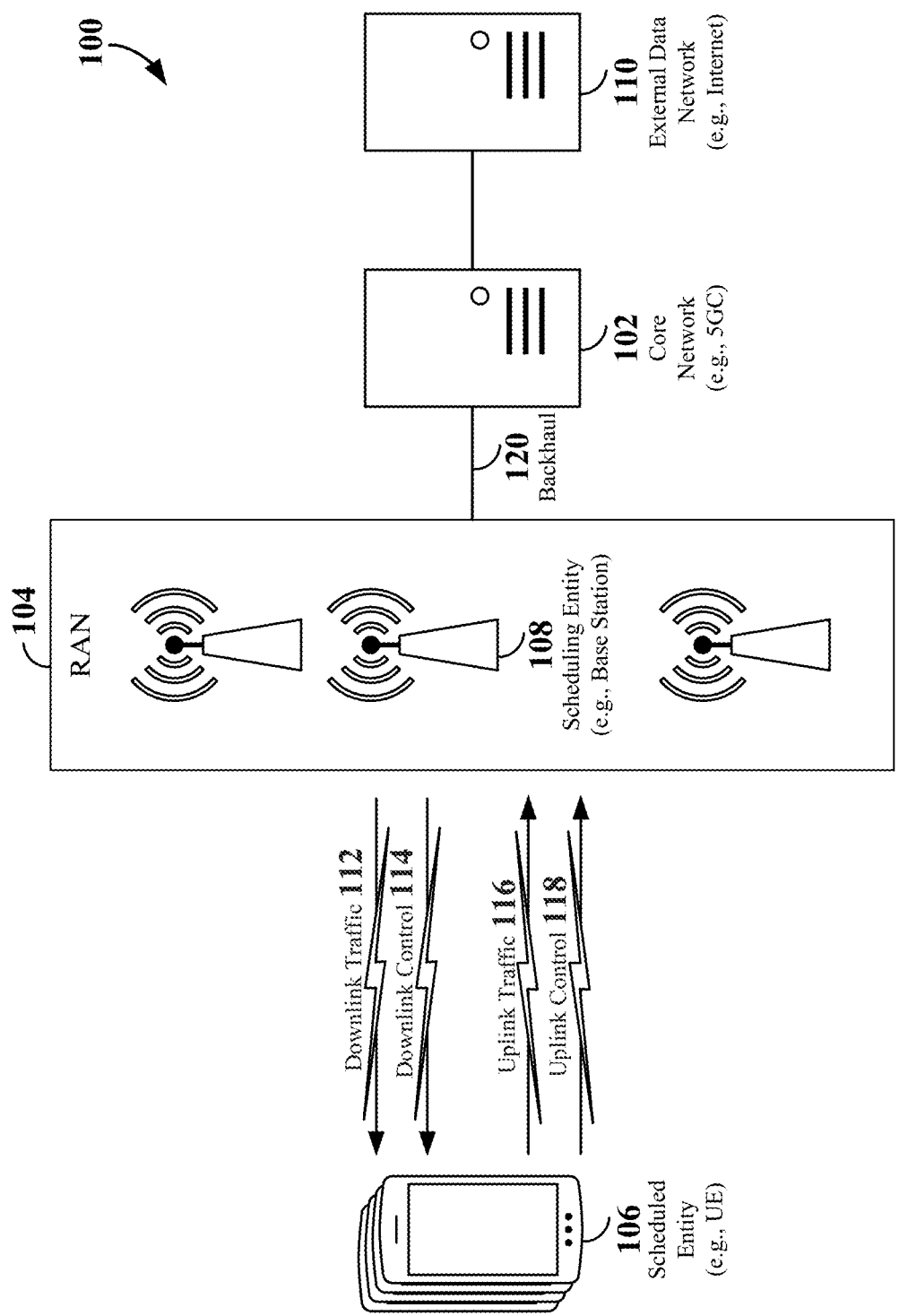
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
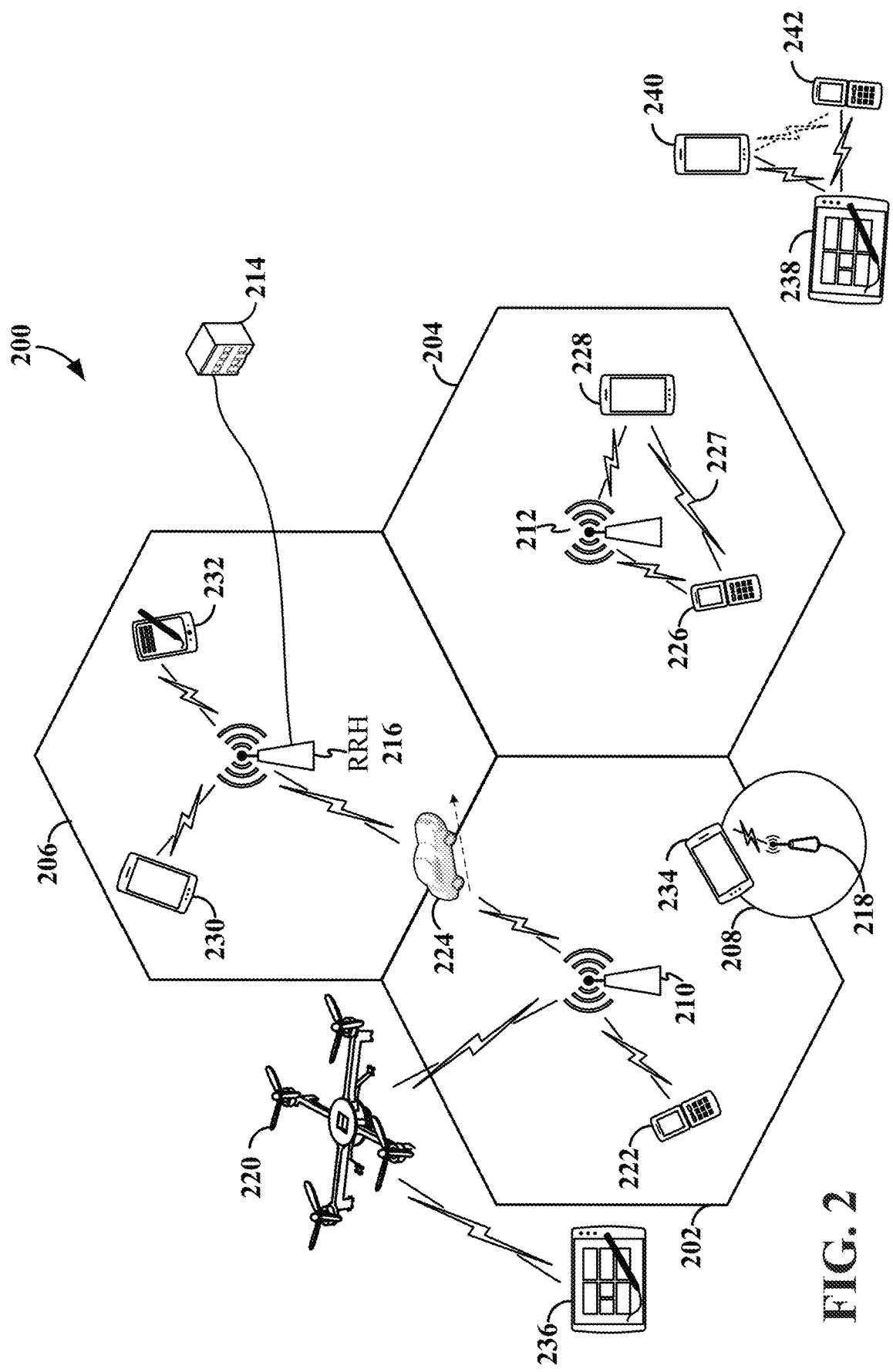
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
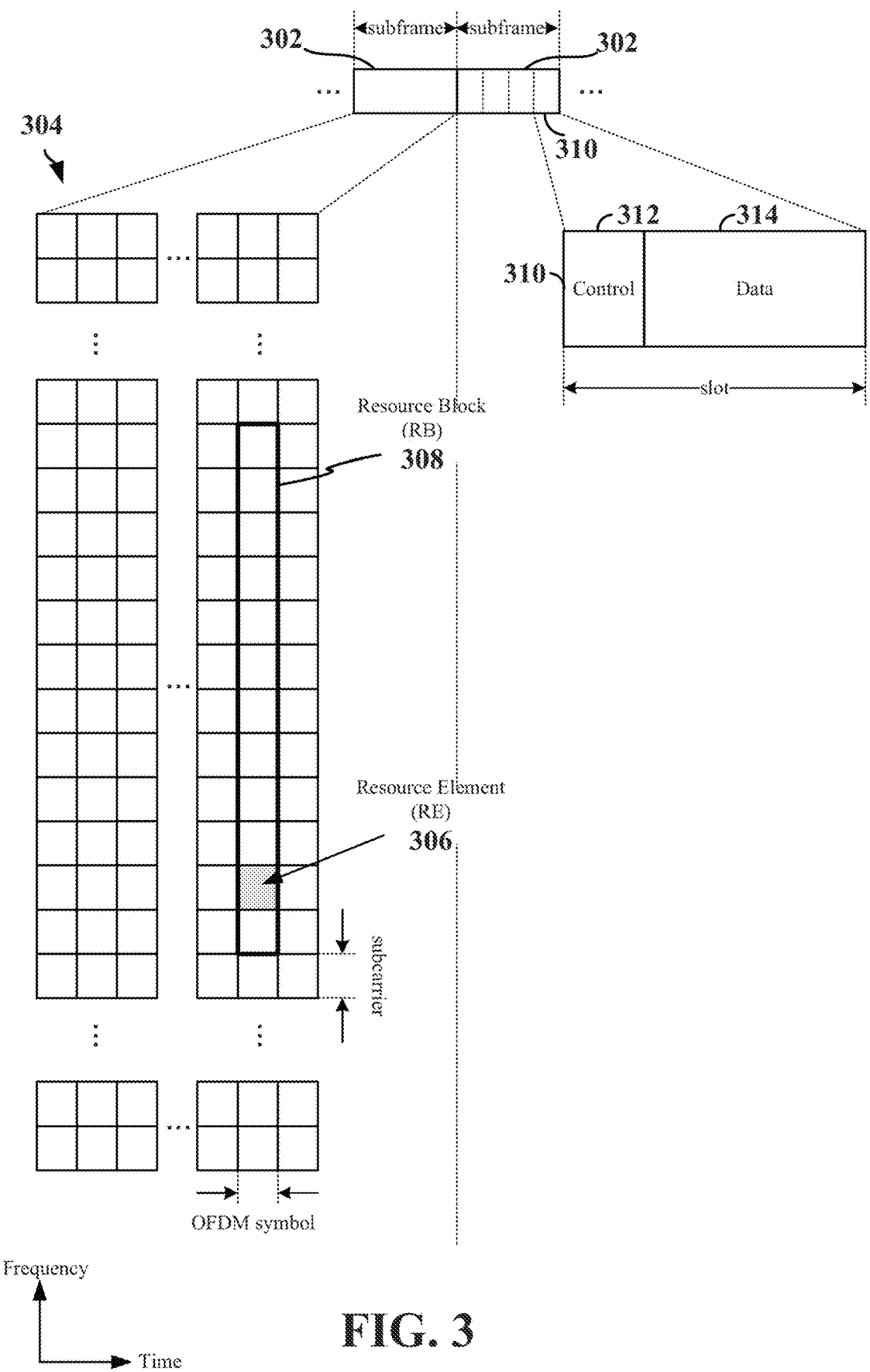
FIG. 3 is a schematic illustration of an organization of wireless resources in an air interface utilizing orthogonal frequency divisional multiplexing (OFDM) according to some aspects.

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); a demodulation reference signal (DM-RS); a phase-tracking reference signal (PT-RS); a channel-state information reference signal (CSI-RS); etc.

The synchronization signals PSS and SSS (collectively referred to as SS), and in some examples, the PBCH, may be transmitted in an SS block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize nonconsecutive symbols for an SSB, within the scope of the present disclosure.

The PDCCH may carry downlink control information (DCI) for one or more UEs supported by one or more serving cells, including but not limited to power control commands, scheduling information, a grant, and/or an assignment of REs for DL and UL transmissions.

In an UL transmission, the transmitting device (e.g., the scheduled entity 106) may utilize one or more REs 306 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
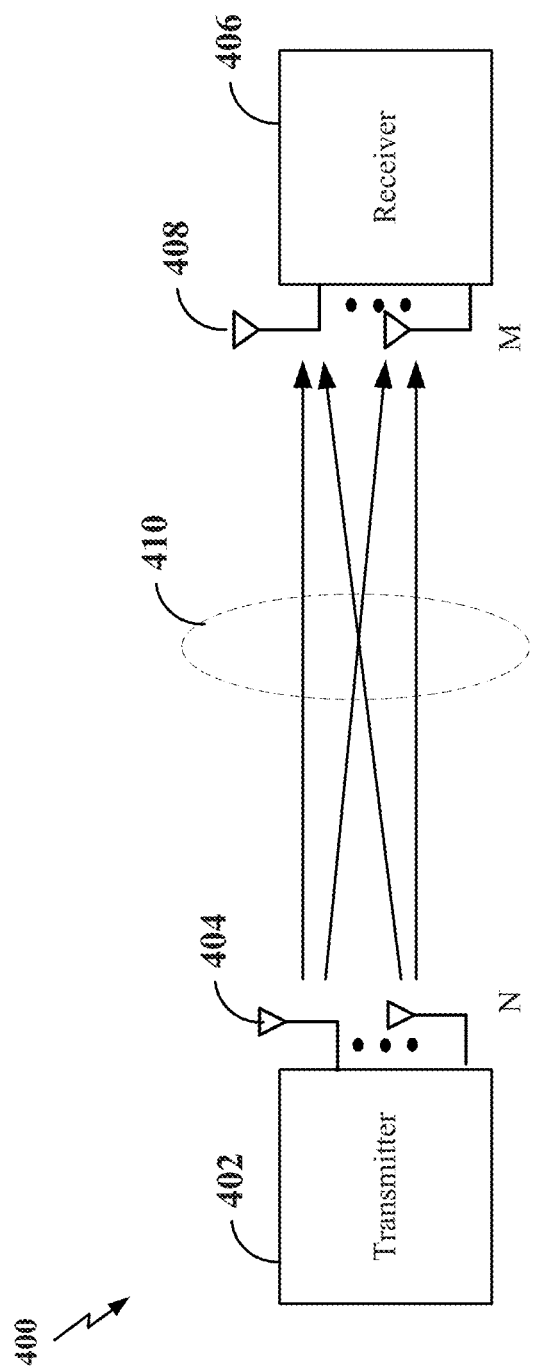
FIG. 4 is a block diagram illustrating a wireless communication system supporting multiple-input multiple-output (MIMO) communication and beamforming according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

In some examples, spatial multiplexing may be implemented using a coordinated multi-point (CoMP) network configuration in which transmissions from multiple transmission points (TRPs) may be simultaneously directed towards a single UE. In a multi-TRP transmission scheme, multiple TRPs may or may not be co-located and may or may not be within a same cell. Each of the multiple TRPs may transmit the same or different data to a user equipment (UE). When transmitting different data from the multiple TRPs, a higher throughput may be achieved. When transmitting the same data (with potentially different redundancy versions) from the multiple TRPs, transmission reliability may be improved. In some examples, each TRP may utilize the same carrier frequency to communicate with a UE. In other examples, each TRP may utilize a different carrier frequency (referred to as a component carrier) and carrier aggregation may be performed at the UE. In this example, the multi-TRP transmission scheme may be referred to as a multi-carrier or multi-cell transmission scheme.

In 5G New Radio (NR), control and data may be communicated between the UE and the base station over a plurality of different beams/paths, each having a different spatial relationship with other beams/paths, via one or more TRPs. When the base station schedules an UL transmission, the base station may indicate one or more parameters of the UL transmission in relationship to a known reference signal (e.g., a reference signal transmitted over particular time-frequency resources via a particular beam/path) that is quasi-co-located (QCLd) with the UL transmission. Here, QCL refers to the ability to infer the properties of the channel over which the UL transmission is transmitted from the channel over which the known reference signal is transmitted. For example, when QCLd, the channels experienced by the two transmissions (e.g., UL transmission and known reference signal) may have the same or similar properties in terms of Doppler spread/shift, average delay spread, and average gain. In some examples, the UL transmission parameters may include a transmission configuration indicator (TCI) state that indicates QCL information (e.g., QCL Type and time-frequency resources) of the reference signal. Examples of QCL types may include one or more of Doppler shift, Doppler spread, average delay, delay spread, and a spatial RX (receiving) parameter.

The power headroom report (PHR) is a type of medium access control (MAC) control element (CE) that includes a power headroom value indicative of an amount of transmission power the UE has relative to the amount of transmission power being used by a current transmission. The UE may calculate the power headroom value by determining a difference between a maximum transmission power of the UE and a current UE transmission power (i.e., the amount of power actually being used) to communicate over the beam/path that is QCLd (e.g., spatially correlated or associated) with a path loss reference signal (PL-RS) that triggered the PHR. Examples of PL-RS may include, but are not limited to, SSBs and CSI-RS. The PL-RS that triggers the PHR may be referred to herein as the triggering PL-RS. The UE may communicate the PHR containing the power headroom value to the base station for use in recommending optimal transmission parameters (such as modulation and coding schemes). The UE may generate the PHR and communicate it to the base station in an UL transmission utilizing resources provided by an UL grant when a next UL grant becomes available to the UE. However, if the next UL grant includes resources (e.g., time-frequency resources) that are not QCLd with the resources associated with the triggering PL-RS, the base station may incorrectly attribute the generated PHR to a different PL-RS associated with the granted UL resources that is distinct from the triggering PL-RS.

In various aspects of the disclosure, a user equipment (UE) may indicate which path loss reference signal (PL-RS), of a plurality of PL-RSs communicated over a plurality of different beams/paths, triggered the UE to generate the PHR. In some examples, the UE may calculate the path loss between the UE and a base station based on the triggering PL-RS and network transmission information indicating the transmission power of the triggering PL-RS. The UE may measure the received power of the triggering PL-RS and determine the path loss by comparing the transmission power of the triggering PL-RS with the UE measured power of the triggering PL-RS. The UE may further determine a path loss change as a difference between the current path loss value and an immediately previous path loss value. The UE may compare the path loss change with a threshold value and determine if the path loss change is greater than the threshold value. If the path loss change is greater than the threshold value, the UE may trigger a PHR that corresponds to the triggering PL-RS.

In one aspect of this disclosure, the UE may wait until an UL grant indicates UL resources that are QCLd with the triggering PL-RS. As such, the UE may ensure that the transmitted PHR is correctly attributed to the triggering PL-RS. For example, when the base station schedules an UL transmission for the UE, the UL grant may include parameters of the scheduled UL transmission that are QCLd with a given PL-RS. In one example, the parameters may include a TCI state indicative of a relationship between the given PL-RS and the UL resource associated with the UL transmission. Thus, the UE may refrain from transmitting the PHR until the UE is granted UL resources that are QCLd with the triggering PL-RS.

In another aspect of this disclosure, the UE may generate and transmit the PHR to the base station using any granted UL resource, regardless of whether the UL resource is associated with the triggering PL-RS. For example, the UE may transmit the PHR using UL resources provided by the first UL grant the UE receives. As such, the UE may ensure timely reporting of path loss events, thus supporting the effectiveness of power control loops. In this example, the UE may determine whether the UL resources are QCLd with the triggering PL-RS. If the UL resources are QCLd with the triggering PL-RS, the UE may communicate the PHR normally. If the UL resources are not QCLd with the triggering PL-RS, the UE may communicate the PHR using a modified MAC CE. The modified MAC CE may include a first octet of data containing an index configured to identify a serving cell that communicated the triggering PL-RS. The first octet of data may also contain an index configured to identify the triggering PL-RS. The modified MAC CE may also include a second octet of data that contains the calculated power headroom based on the triggering PL-RS.

Figure 5:
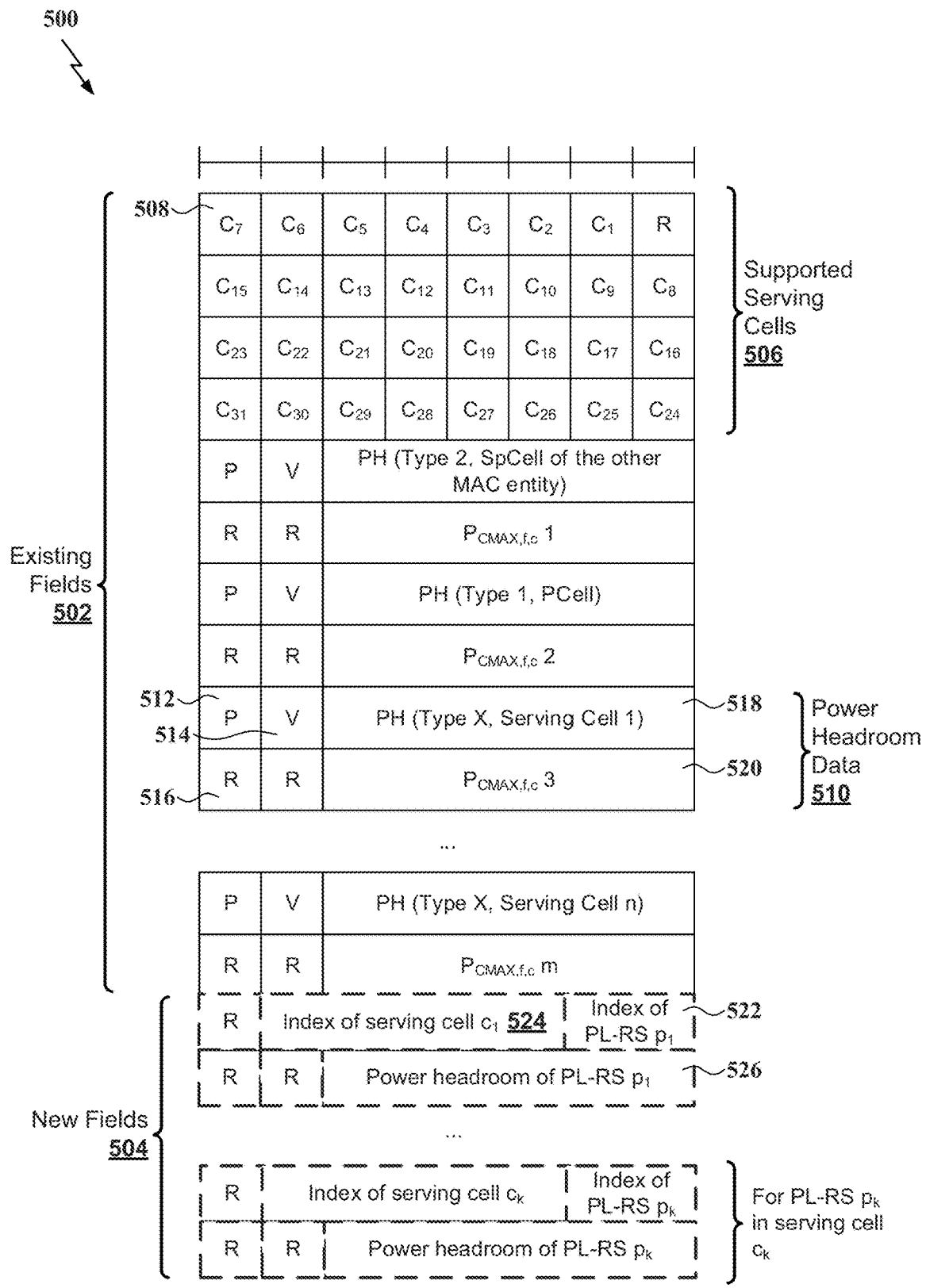
FIG. 5 is a schematic illustration of an exemplary power headroom report (PHR) according to some aspects.

FIG. 5 illustrates an example PHR MAC CE 500 supporting up to 32 serving cells and containing existing fields 502 as well as optional new fields 504. The PHR MAC CE 500 may be utilized to communicate a plurality of triggering PL-RSs in one or more serving cells. The existing fields 502 may include one or more octets configured to identify one or more supported serving cells 506. The bits associated with these octets may indicate whether the PHR MAC CE 500 includes a power headroom value for a particular serving cell, where the particular serving cell is identified by an index number. In one example, a first bit 508 ("$C_7$") may be set to indicate the presence of a power headroom value for a serving cell of index 7. If the first bit 508 is set to "1," then a power headroom value for the index 7 serving cell is reported in the PHR MAC CE 500. Conversely, if the first bit 508 is set to "0," then a power headroom value for the index 7 serving cell is not reported.

The existing fields 502 may also include one or more octets configured to provide power headroom data 510. For example, a second bit 512 ("P") may be configured to indicate whether a UE is applying a power backoff. A third bit 514 ("V") may be configured to indicate if additional entry(s) for the associated serving cell are included. In this example, the third bit 514 may indicate that a new field 504 for a corresponding serving cell is reported in the PHR MAC CE 500. If the third bit 514 is set to "0," then no additional entry is present for the corresponding serving cell. If the third bit 514 is set to "1," then additional entry(s) are present.

A fourth bit 516 ("R") may relate to a reserved field, or may be configured to indicate whether data presented in the power headroom data 510 relates to a maximum transmission power for a UE ($P_{CMAX,f,c}$), or a power headroom level. In this example, setting the fourth bit 516 to "0" indicates that the remaining bits of the octet relates to the maximum transmission power for the UE ($P_{CMAX,f,c}$); whereas setting the fourth bit 516 to "1" indicates that the remaining bits of the octet relate to power headroom of the trigger PL-RS.

In addition, a first field 518 of the power headroom data 510 may include one or more bits indicating a power headroom level. A second field 520 of the power headroom data 510 may include one or more bits indicating a maximum transmission power for a UE, where the maximum transmission power may be used for calculation of the power headroom level 518.

The new fields 504 may include an octet containing one or more bits indicative of a PL-RS index 522. The octet may also include a serving cell index 524 that corresponds to the PL-RS index 522. For example, the octet may be used by the UE to indicate that a serving cell with index 1 ($c_1$) transmitted a PL-RS with index 1 ($p_1$), where the index 1 PL-RS triggered a corresponding PHR MAC CE 500 containing power headroom value 526 corresponding to the index 1 PL-RS. As noted above, the third bit 514 may be configured to indicate that the new fields 504 for the associated serving cell are included in the PHR MAC CE 500. Wireless communication with a UE may include any number of PL-RSs and serving cells, and as such, the new fields 504 may include a corresponding number of octets or bytes for communicating data. Of course, the foregoing is merely provided as an example, and other PHR MAC CE configurations may be included within various aspects of the present disclosure.

The UE may report its power headroom to the base station using one or more of the existing fields 502 and/or the new fields 504. In one example, the UE may calculate path loss between the UE and a base station after receiving a triggering PL-RS and corresponding network transmission information containing the transmission power of the triggering PL-RS. The UE may measure the power of the received triggering PL-RS to determine the received power of the triggering PL-RS. The UE may determine the path loss by calculating the difference between the transmission power of the triggering PL-RS provided by the network transmission information and the UE measured power of the triggering PL-RS. The UE may then determine the path loss change and compare the path loss change with a threshold value to determine if the path loss change is greater than the threshold value. If the path loss change is greater than the threshold value, the UE may trigger generation of the PHR MAC CE 500.

In one example, the UE may wait until an UL grant indicates UL resources (e.g., a portion of a PUSCH) that are QCLd with the triggering PL-RS. In this example, the UE may communicate a PHR MAC CE 500 that contains one or more of the existing fields 502, but none of the new fields 504.

In another example, the UE may generate and transmit the PHR MAC CE 500 to the base station at the first opportunity that PUSCH resources are made available for UL. For example, the UE may transmit the PHR using UL resources provided by the first UL grant the UE receives after receiving the triggering PL-RS. In this example, the UE may determine whether the granted UL resources are QCLd with the triggering PL-RS. If the UL resources are QCLd with the triggering PL-RS, the UE may communicate the PHR MAC CE 500 using one or more of the existing fields 502, but none of the new fields 504.

If the granted UL resources are not QCLd with the triggering PL-RS, the UE may communicate the PHR MAC CE 500 using one or more of the existing fields 502 and the new fields 504. In this example, because the granted UL resources are not QCLd with the triggering PL-RS, one or more new fields 504 may be added to the PHR MAC CE 500 in order to indicate the triggering PL-RS and the corresponding power headroom value to the base station. For example, the UE may transmit a PHR MAC CE 500 containing a new field 504 that indicates a PL-RS index 522 identifying the PL-RS that triggered the UE to generate the PHR. The new field 504 may also include an index of the serving cell that communicated the triggering PL-RS. The new field 504 may also include a power headroom value that the UE calculated based on the triggering PL-RS. One or more of the existing fields 502 of the PHR MAC CE 500 may be used to notify the receiving base station that additional PHR data is provided in a new field 504.

Figure 6:
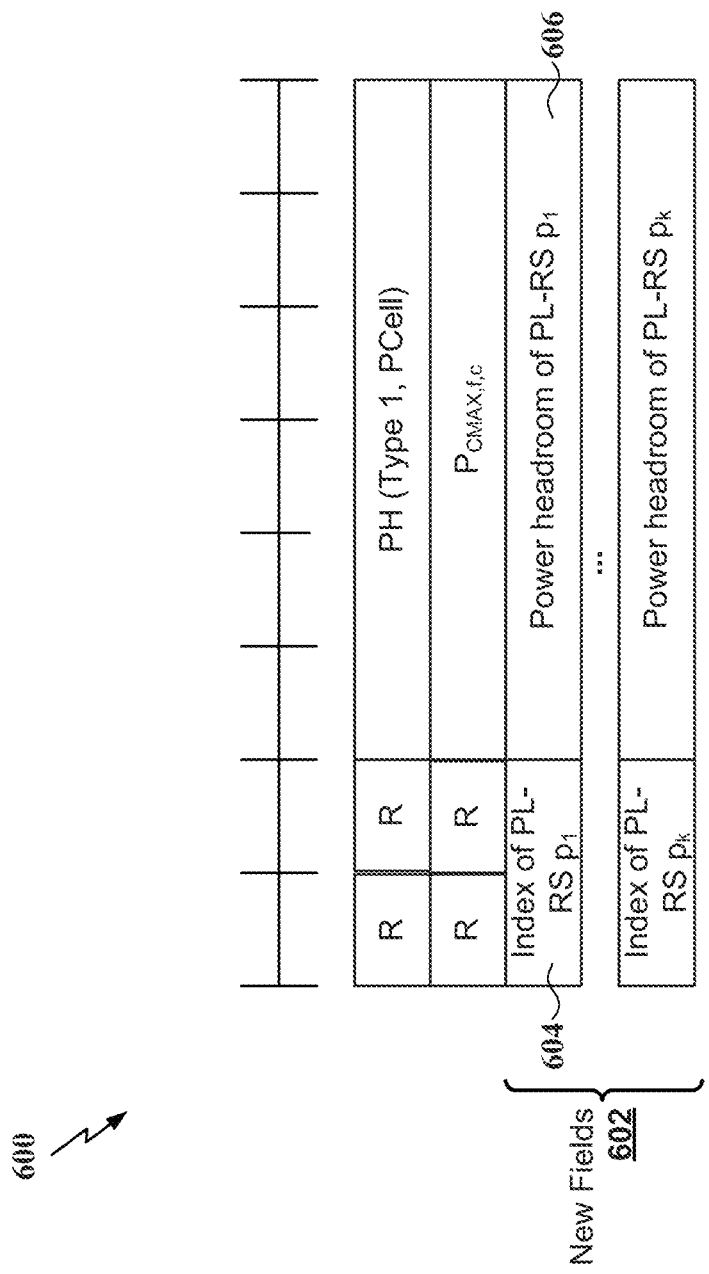
FIG. 6 is a schematic illustration of an exemplary single-entry power headroom report (PHR) according to some aspects.

FIG. 6 is a schematic illustration of an exemplary single-entry PHR MAC CE 600. According to some aspects of the disclosure, the single-entry PHR MAC CE 600 may include new field 602 containing an index of a PL-RS that triggered the PHR, as well as a UE calculated power headroom. One or more new fields 602 may each relate to a distinct triggering PL-RS of the same serving cell, and may appear at the end of the PHR MAC CE. Each octet may include: an index 604 of a triggering PL-RS at the first two bits, and the virtual power headroom 606 of the triggering PL-RS at the other six bits. Of course, the foregoing is merely provided as an example, and other PHR MAC CE configurations may be included within various aspects of the present disclosure.

Figure 7:
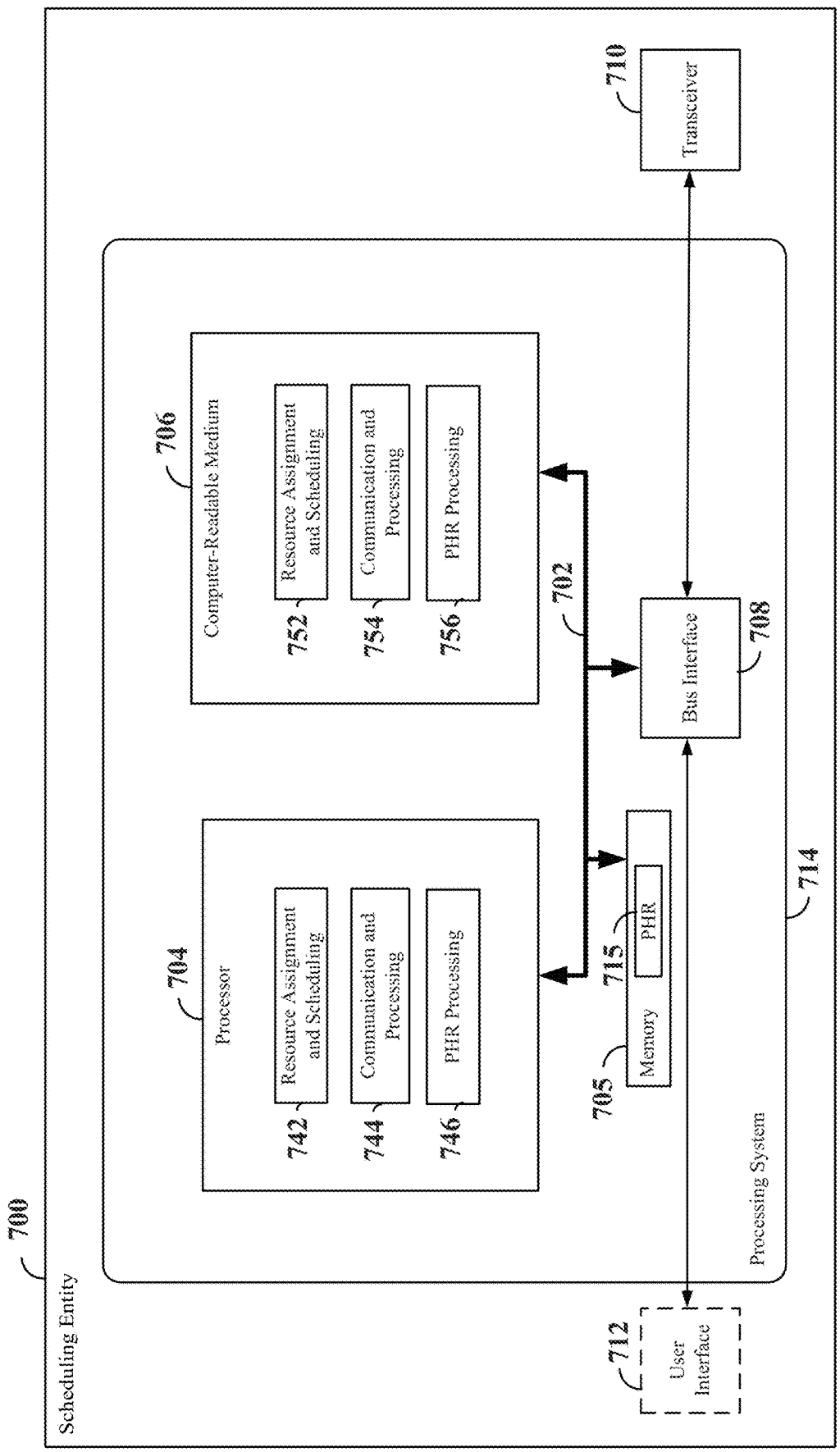
FIG. 7 is a block diagram conceptually illustrating an example of a hardware implementation for a scheduling entity according to some aspects.

FIG. 7 is a block diagram illustrating an example of a hardware implementation for a scheduling entity 700 employing a processing system 714. For example, the scheduling entity 700 may be a user equipment (UE) as illustrated in any one or more of FIGS. 1, 2, and/or 4. In another example, the scheduling entity 700 may be a base station as illustrated in any one or more of FIGS. 1, 2, and/or 4.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 704, as utilized in a scheduling entity 700, may be used to implement any one or more of the processes described below. The processor 704 may in some instances be implemented via a baseband or modem chip and in other implementations, the processor 704 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include resource assignment and scheduling circuitry 742, configured to generate, schedule, and modify a resource assignment or grant of time-frequency resources (e.g., a set of one or more resource elements). For example, the resource assignment and scheduling circuitry 742 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 742 may be configured to allocate/schedule downlink resources for the transmission of one or more PL-RS. The PL-RS reference signals may be transmitted on different beams and/or via different TRPs associated with the scheduling entity and/or other scheduling entities. The resource assignment and scheduling circuitry 742 may further be configured to allocate/schedule uplink resources for a UE to communicate information to the scheduling entity 700. For example, the uplink resources may be utilized by the UE to communicate a PHR 715 to the scheduling entity 700. The uplink resources may be a dynamically scheduled via an uplink grant, semi-statically scheduled, or semi-persistently scheduled. The resource assignment and scheduling circuitry 742 may further be configured to execute resource assignment and scheduling software 752 stored in the computer-readable medium 706 to implement one or more of the functions described herein.

The processor 704 may further include communication and processing circuitry 744 configured to communicate with a UE. In some examples, the communication and processing circuitry 744 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 744 may be configured to generate and transmit one or more PL-RS via the transceiver 710. In addition, the communication and processing circuitry 744 may be configured to receive and process a PHR 715 via the transceiver 710. The PHR 715 may be stored, for example, in memory 705. The communication and processing circuitry 744 may further be configured to execute communication and processing software 754 stored on the computer-readable medium 706 to implement one or more functions described herein.

The processor 704 may further include power headroom report (PHR) processing circuitry 746 configured to process a PHR 715 (e.g., a PHR MAC CE) generated and communicated by a UE. In some examples, the PHR processing circuitry 746 may be configured to process one or more existing fields and/or new fields of the PHR MAC CE 715. For example, the fields of the PHR MAC CE 715 may correspond to the PHR MAC CE fields illustrated in FIG. 5. The PHR processing circuitry 746 may further be configured to attribute a power headroom value extracted from the PHR MAC CE 715 corresponding to the scheduling entity 700 to a particular PL-RS (e.g., particular resources and a particular beam/path over which the particular PL-RS was transmitted). For example, when the PHR MAC CE 715 excludes information identifying the particular PL-RS that triggered the PHR, the PHR processing circuitry 746 may attribute the PHR to a PL-RS that is QCLd with the uplink resources over which the PHR MAC CE 715 was received. However, when the PHR MAC CE 715 includes information identifying the particular PL-RS that triggered the PHR (e.g., the index of the PL-RS), the PHR processing circuitry 746 may attribute the PHR to the identified PL-RS. The PHR processing circuitry 746 may further be configured to execute PHR processing software 756 stored on the computer-readable medium 706 to implement one or more functions described herein.

Figure 8:
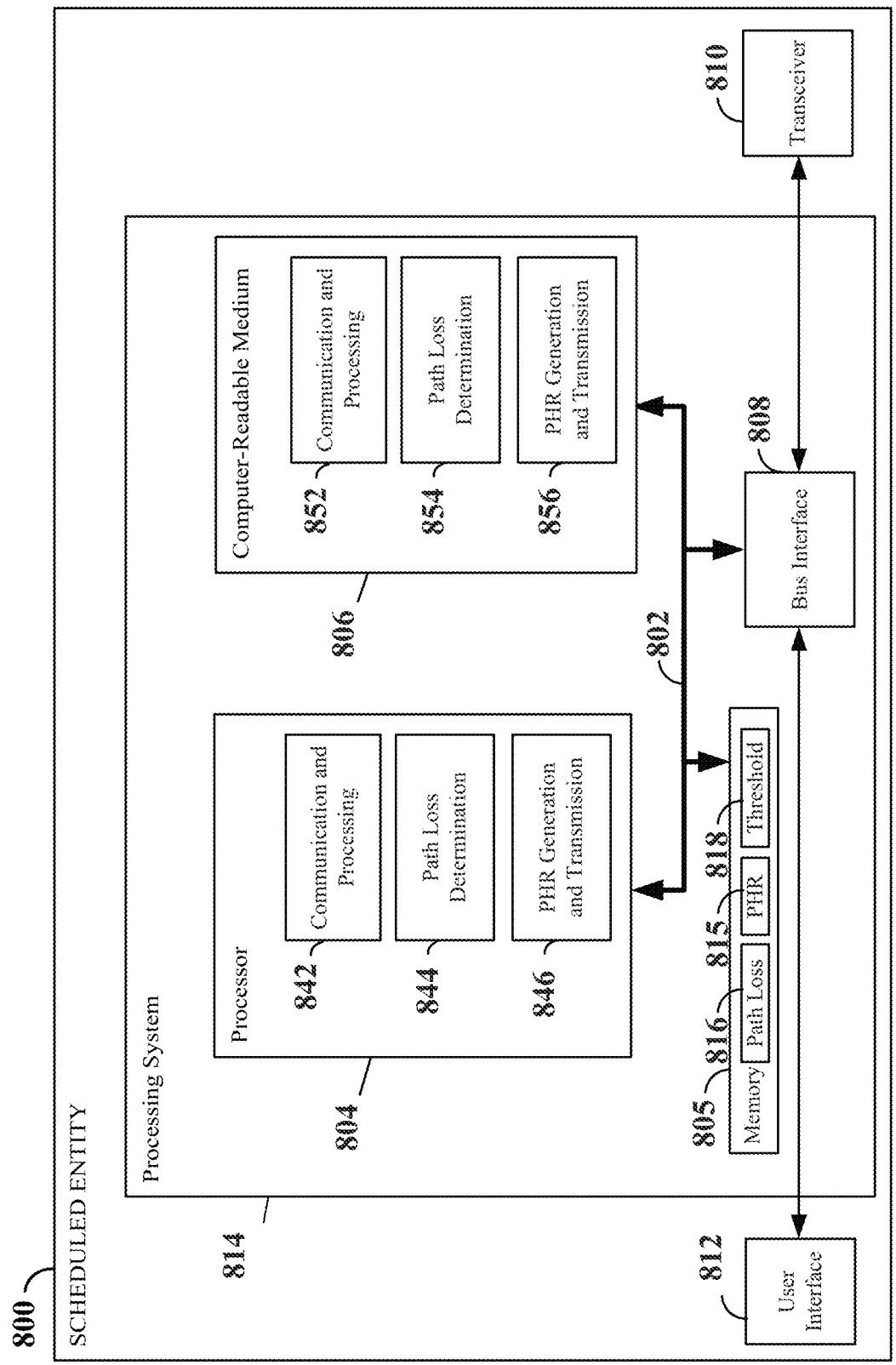
FIG. 8 is a block diagram conceptually illustrating an example of a hardware implementation for a scheduled entity according to some aspects.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1, 2, and/or 4.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be used to implement any one or more of the processes described herein.

In some aspects of the disclosure, the processor 804 may include communication and processing circuitry 842, configured to communicate with one or more base stations (e.g., one or more TRPs corresponding to one or more base stations). In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 842 may be configured to receive and process one or more PL-RS from the one or more base stations via the transceiver 810. In addition, the communication and processing circuitry 842 may be configured to identify uplink resources that may be utilized to transmit a PHR to a base station. The communication and processing circuitry 842 may further be configured to transmit the PHR utilizing the uplink resources in response to processing the PL-RS. The communication and processing circuitry 842 may further be configured to execute communication and processing software 852 stored on the computer-readable medium 806 to implement one or more functions described herein.

The processor 804 may further include path loss determination circuitry 844, configured to determine a path loss 816 based on a triggering PL-RS received from a base station via the communication and processing circuitry 842 and the transceiver 810. In some examples, the path loss determination circuitry 844 may receive a transmission power of the triggering PL-RS from the base station (e.g., via the communication and processing circuitry 842 and transceiver 810), measure the received power of the triggering PL-RS, and calculate the path loss 816 by comparing the transmission power of the triggering PL-RS with the measured power of the triggering PL-RS. The path loss determination circuitry 844 may further store the path loss 816 in, for example, memory 805 to enable the path loss determination circuitry 844 to further calculate a path loss change as a difference between the current path loss value and an immediately previous path loss value. The path loss determination circuitry 844 may further be configured to execute path loss determination software 854 stored on the computer-readable medium 806 to implement one or more functions described herein.

The processor 804 may further include PHR generation and transmission circuitry 846, configured to generate a PHR 815 based on the path loss change. In some examples, the PHR generation circuitry 846 may compare the path loss change with a threshold value 818 (e.g., stored in memory 805) and determine if the path loss change is greater than the threshold value 818. If the path loss change is greater than the threshold value 818, the UE may trigger generation of the PHR 815. The PHR generation and transmission circuitry 846 may further transmit the PHR 815 on uplink resources scheduled by the base station.

The PHR 815 may indicate the triggering PL-RS that triggered generation of the PHR 814 either by transmitting the PHR on uplink resources QCLd with the triggering PL-RS or by specifically indicating the PL-RS in the PHR. In some examples, the PHR generation and transmission circuitry 846 may delay transmission of the PHR 815 until an uplink grant is received or other semi-statically or semi-persistently scheduled uplink resources are identified that are QCLd with the triggering PL-RS. In one example, the communication and processing circuitry 842 may receive at least one previous uplink grant of additional uplink resources that are not QCLd with the triggering PL-RS and the PHR generation and transmission circuitry 846 may prevent the PHR 815 from being transmitted on the additional uplink resources. In some examples, the additional uplink resources may be previously identified semi-statically or semi-persistently scheduled resources.

In other examples, the PHR generation and transmission circuitry 846 may include information associated with the triggering PL-RS in the PHR 815 to indicate the triggering PL-RS to the base station. In some examples, the PHR 815 may be a PHR MAC CE (e.g., the PHR MAC CE 500 shown in FIG. 5) including one or more existing and/or new fields. For example, one or more new fields of the PHR MAC CE 815 may include an index of the triggering PL-RS, an index of a serving cell corresponding to the PL-RS (e.g., the base station that transmitted the PL-RS), and/or a power headroom value corresponding to the PL-RS. The PHR generation and transmission circuitry 846 may further be configured to execute PHR generation and transmission software 856 stored on the computer-readable medium 806 to implement one or more functions described herein.

Figure 9:
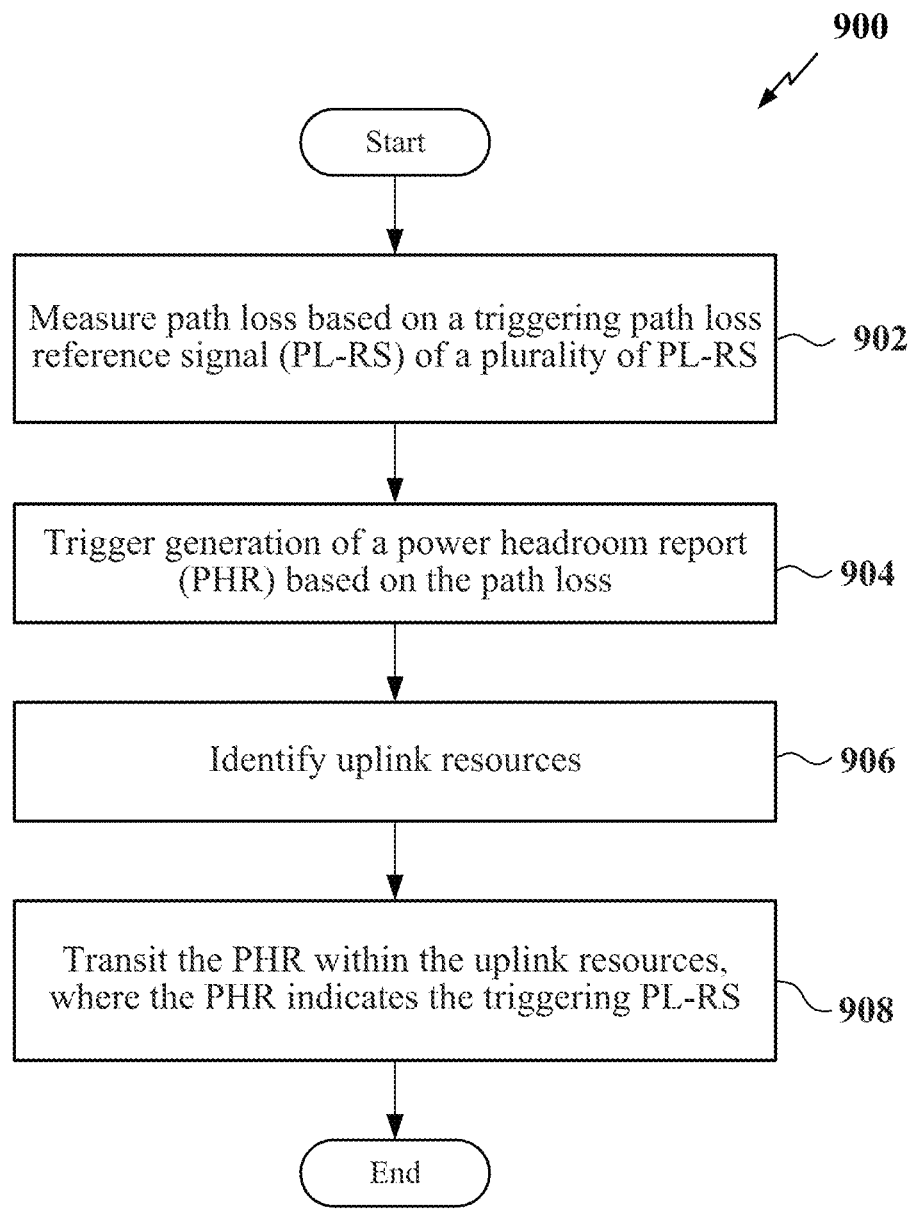
FIG. 9 is a flow chart illustrating an exemplary process for generating and communicating a PHR according to some aspects.

FIG. 9 is a flow chart illustrating an exemplary process 900 for generating and communicating a PHR in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 800 illustrated in FIG. 8. In some examples, the process 900 may be carried out by any suitable apparatus or means for carrying out the functions or algorithm described below.

At block 902, the scheduled entity may measure a path loss between the scheduled entity and a scheduling entity based on a triggering path loss reference signal (PL-RS) of a plurality of PL-RS. In some examples, each of the PL-RS may be associated with a different beam/path, where each beam/path is associated with a particular transmission reception point (TRP) of a scheduling entity. In some examples, the scheduled entity may measure the path loss by measuring the received power of the triggering PL-RS and comparing the transmission power of the triggering PL-RS with the measured power of the triggering PL-RS. For example, the communication and processing circuitry 842, path loss determination circuitry 844, and the transceiver 810 shown and described above in connection with FIG. 8 may receive the triggering PL-RS and measure the path loss based on the triggering PL-RS.

At block 904, the scheduled entity may trigger generation of a power headroom report (PHR) based on the path loss. In some examples, the scheduled entity may compare a path loss change (e.g., a change between the current measured path loss and a previously measured path loss) with a threshold value and determine if the path loss change is greater than the threshold value. If the path loss change is greater than the threshold value, the scheduled entity may trigger generation of the PHR. For example, the PHR generation and transmission circuitry 846 shown and described above in connection with FIG. 8 may trigger generation of the PHR based on the path loss.

At block 906, the scheduled entity may identify uplink resources for communication of the PHR. In some examples, the uplink resources may be identified via an uplink (UL) grant or may be identified via semi-static or semi-persistent scheduling. The UL grant (or semi-static/semi-persistent scheduling) may indicate one or more UL transmission parameters in relationship to a known reference signal (e.g., a reference signal transmitted over particular time-frequency resources via a particular beam/path) that is quasi-co-located (QCLd) with the uplink resources. In some examples, the UL transmission parameters may include a transmission configuration indicator (TCI) state that indicates QCL information (e.g., QCL Type and time-frequency resources) of the reference signal. For example, the communication and processing circuitry 842 and the transceiver 810 shown and described above in connection with FIG. 8 may receive the UL grant of UL resources.

At block 908, the scheduled entity may transmit the PHR within the UL resources, where the PHR indicates the triggering PL-RS. In some examples, the scheduled entity may determine whether the triggering PL-RS is QCLd with the UL resources. If so, the scheduled entity may transmit the PHR within the UL resources without including information associated with the triggering PL-RS. If not, the scheduled entity may include information associated with the triggering PL-RS in the PHR. In some examples, the information associated with the triggering PL-RS may include a first index of the triggering PL-RS. The information associated with the triggering PL-Rs may further include a second index of a serving cell corresponding to the triggering PL-RS and/or a power headroom value corresponding to the triggering PL-RS. For example, the PHR generation and transmission circuitry 846, communication and processing circuitry 842 and transceiver 810 shown and described above in connection with FIG. 8 may transmit the PHR within the UL resources.

Figure 10:
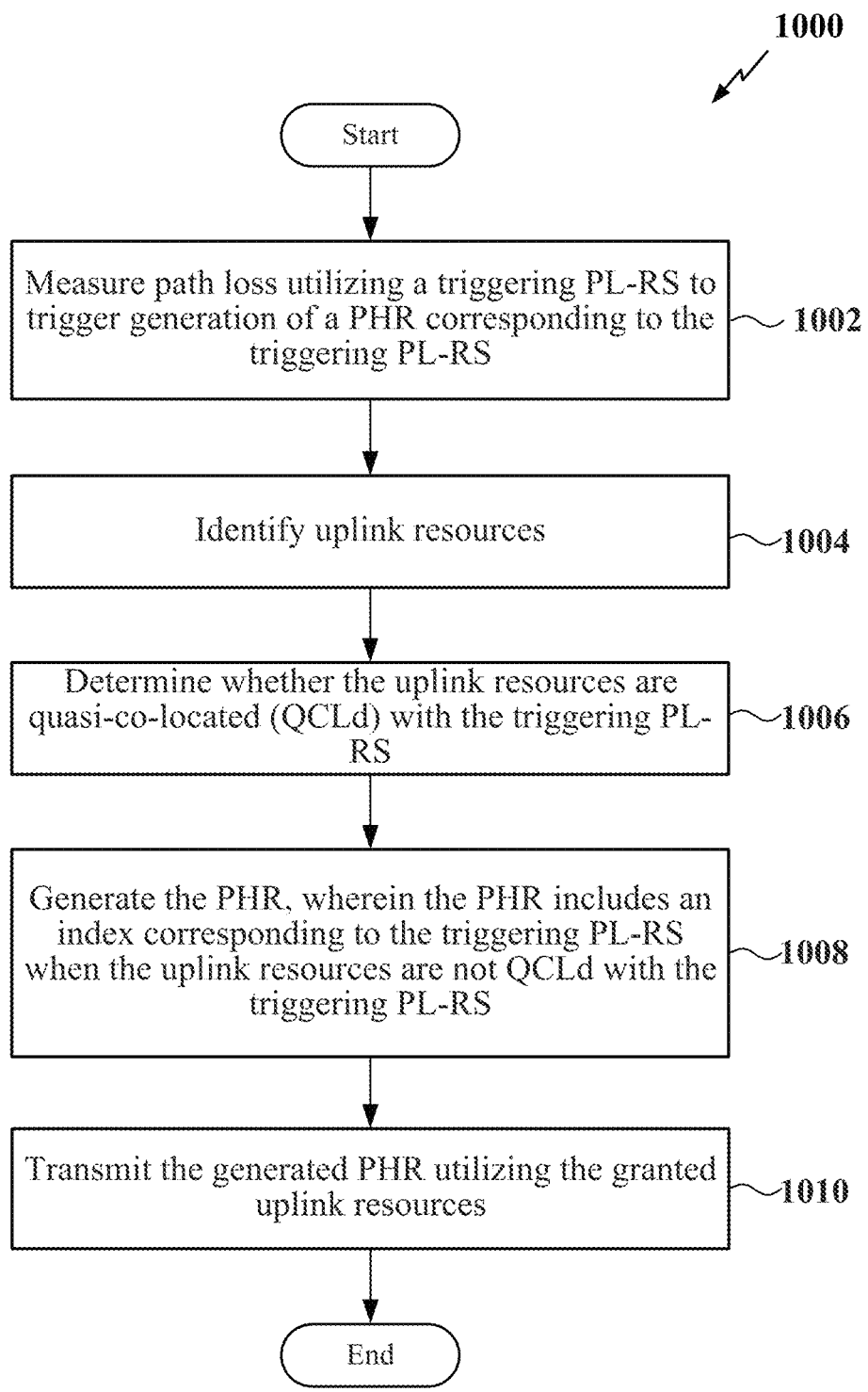
FIG. 10 is a flow chart illustrating an exemplary process for generating and communicating a PHR according to some aspects.

FIG. 10 is a flow chart illustrating an exemplary process 1000 for generating and communicating a PHR in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 800 illustrated in FIG. 8. In some examples, the process 1000 may be carried out by any suitable apparatus or means for carrying out the functions or algorithm described below.

At block 1002, the scheduled entity may measure a path loss between the scheduled entity and a scheduling entity utilizing a triggering PL-RS to trigger generation of a PHR corresponding to the triggering PL-RS. The scheduled entity may calculate the path loss between the scheduled entity and a scheduling entity by receiving a communication containing a triggering PL-RS and network transmission information containing the transmission power of the triggering PL-RS. The scheduled entity may also measure the power of the received triggering PL-RS to determine the actual transmission power of the triggering PL-RS as it is received at the scheduled entity. The scheduled entity may determine the path loss by comparing the transmission power of the triggering PL-RS as provided by the network transmission information, with the power measured by the scheduled entity of the triggering PL-RS. The scheduled entity may then calculate the path loss change as the difference between the current calculated path loss and an immediately previously calculated path loss and compare the path loss change with a threshold value. If the path loss change is greater than the threshold value, the scheduled entity may trigger a power headroom report PHR. For example, the communication and processing circuitry 842 and path loss determination circuitry 844 shown and described above in connection with FIG. 8 may receive the triggering PL-RS and measure the path loss based on the triggering PL-RS.

At block 1004, the scheduled entity may identify UL resources for communication of the PHR. In some examples, the UL resources may be identified via an UL grant or may be identified via semi-static or semi-persistent scheduling. The UL grant (or semi-static/semi-persistent scheduling) may include a transmission configuration indicator (TCI) state. For example, the communication and processing circuitry 842 and the transceiver 810, shown and described above in connection with FIG. 8 may receive the UL grant of UL resources.

At block 1006, the scheduled entity may determine whether the UL resources are quasi-co-located (QCLd) with the triggering PL-RS. In one example, the scheduled entity may utilize the TCI state to determine whether the UL resources are QCLd with the triggering PL-RS. For example, the PHR generation and transmission circuitry 846 shown and described above in connection with FIG. 8 may determine whether the UL resources are QCLd with the triggering PL-RS.

At block 1008, the scheduled entity may generate the PHR, where the PHR includes an index corresponding to the triggering PL-RS if the scheduled entity determines that the UL resources are not QCLd with the triggering PL-RS. In one example, if the granted UL resources are not QCLd with the triggering PL-RS, the scheduled entity may communicate the PHR using one or more of the existing fields and the new fields shown and described above in connection to FIGS. 5 and 6. In this example, because the granted UL resources are not QCLd with the PL-RS, one or more new fields may be added to the PHR in order to indicate to the scheduling entity the triggering PL-RS and the corresponding power headroom value. For example, the PHR generation and transmission circuitry 846 shown and described above in connection with FIG. 8 may generate the PHR including the triggering PL-RS index.

At block 1010, the scheduled entity may transmit the generated PHR utilizing the granted UL resources. For example, the communication and processing circuitry 842 and the transceiver 810, shown and described above in connection with FIG. 8 may transmit the PHR.

Figure 11:
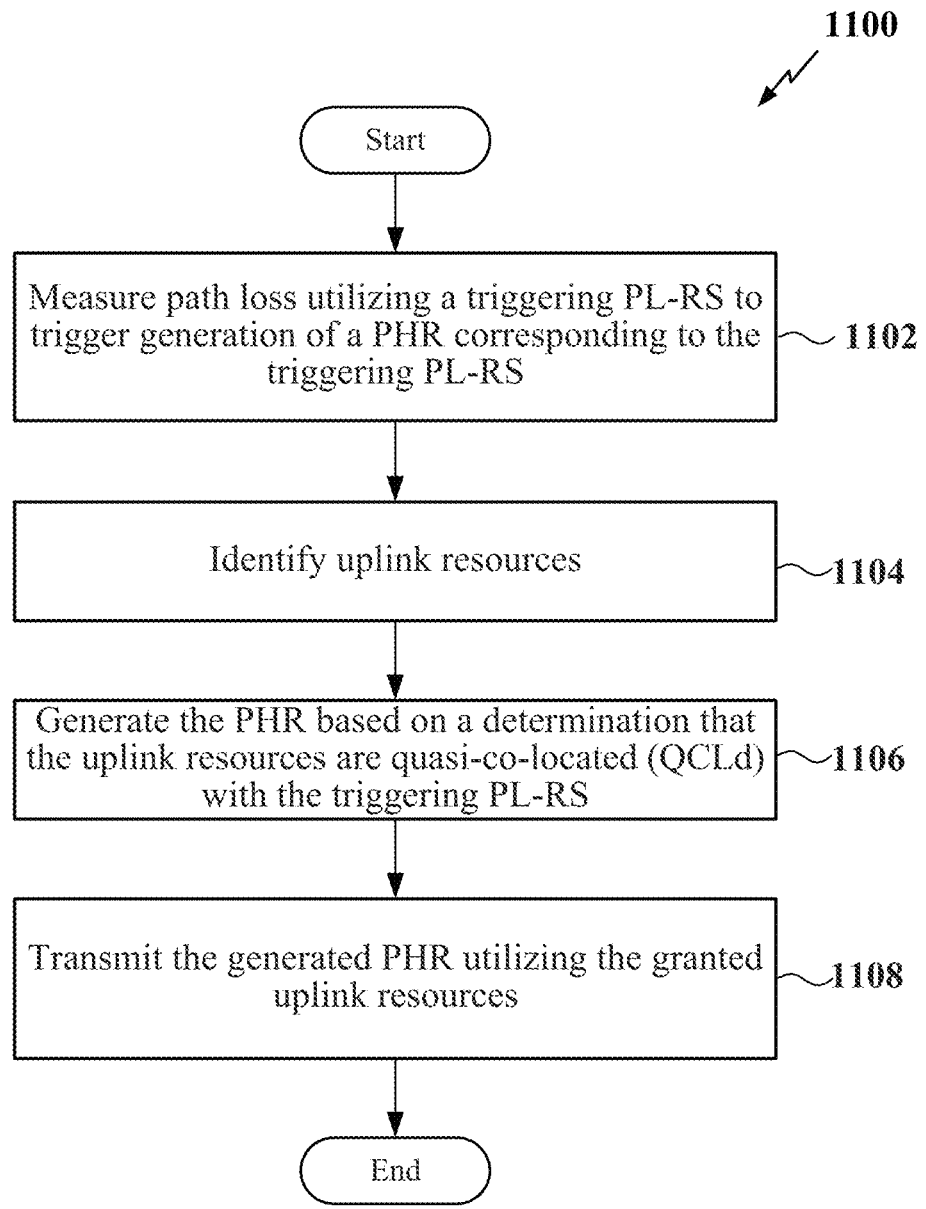
FIG. 11 is a flow chart illustrating an exemplary process for generating and communicating a PHR according to some aspects.

FIG. 11 is a flow chart illustrating an exemplary process 1100 for generating and communicating a PHR in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 800 illustrated in FIG. 8. In some examples, the process 1100 may be carried out by any suitable apparatus or means for carrying out the functions or algorithm described below.

At block 1102, the scheduled entity may measure a path loss utilizing a triggering PL-RS to trigger generation of a PHR corresponding to the triggering PL-RS. The scheduled entity may calculate the path loss between the scheduled entity and a scheduling entity by receiving a communication containing a triggering PL-RS and network transmission information containing transmission power of the triggering PL-RS. The scheduled entity may also measure the power of the received triggering PL-RS to determine the actual transmission power of the triggering PL-RS as it is received at the scheduled entity. The scheduled entity may determine the path loss by comparing the transmission power of the triggering PL-RS as provided by the network transmission information, with the power measured by the scheduled entity of the triggering PL-RS. The scheduled entity may then calculate the path loss change as the difference between the current calculated path loss and an immediately previously calculated path loss and compare the path loss change with a threshold value. If the path loss change is greater than the threshold value, the scheduled entity may trigger a power headroom report PHR. For example, the communication and processing circuitry 842 and path loss determination circuitry 844 shown and described above in connection with FIG. 8 may receive the triggering PL-RS and measure the path loss based on the triggering PL-RS.

At block 1104, the scheduled entity may identify UL resources for communication of the PHR. In some examples, the UL resources may be identified via an uplink (UL) grant or may be identified via semi-static or semi-persistent scheduling. The UL grant (or semi-static/semi-persistent scheduling) may include a transmission configuration indicator (TCI) state. For example, the communication and processing circuitry 842 and the transceiver 810, shown and described above in connection with FIG. 8 may receive the UL grant of UL resources.

At block 1106, the scheduled entity may generate the PHR based on a determination that the UL resources are quasi-co-located (QCLd) with the triggering PL-RS. In one example, the scheduled entity may utilize the TCI state to determine whether the UL resources are QCLd with the triggering PL-RS. In this example, the scheduled entity may wait until an UL grant indicates UL resources (e.g., a portion of a PUSCH) that are QCLd with the triggering PL-RS. As such, the scheduled entity may ensure that the PHR it transmits to the scheduling entity is correctly attributed to the triggering PL-RS. For example, when the scheduling entity schedules an UL transmission, the UL grant may include UL transmission parameters (e.g., TCI state) of the scheduled UL transmission that relate it to a given PL-RS. Thus, the scheduled entity may refrain from transmitting the PHR until UL resources that are QCLd with the triggering PL-RS are granted. In this example, the scheduled entity may communicate a PHR that contains one or more of the existing fields but none of the new fields shown and described above in connection with FIGS. 5 and 6. This may reduce overhead associated with the additional new fields. For example, the PHR generation and transmission circuitry 846 shown and described above in connection with FIG. 8 may determine whether the UL resources are QCLd with the triggering PL-RS, and if so, generate the PHR.

At block 1108, the scheduled entity may transmit the generated PHR utilizing the granted UL resources. For example, the communication and processing circuitry 842 and the transceiver 810, shown and described above in connection with FIG. 8 may transmit the PHR.

Figure 12:
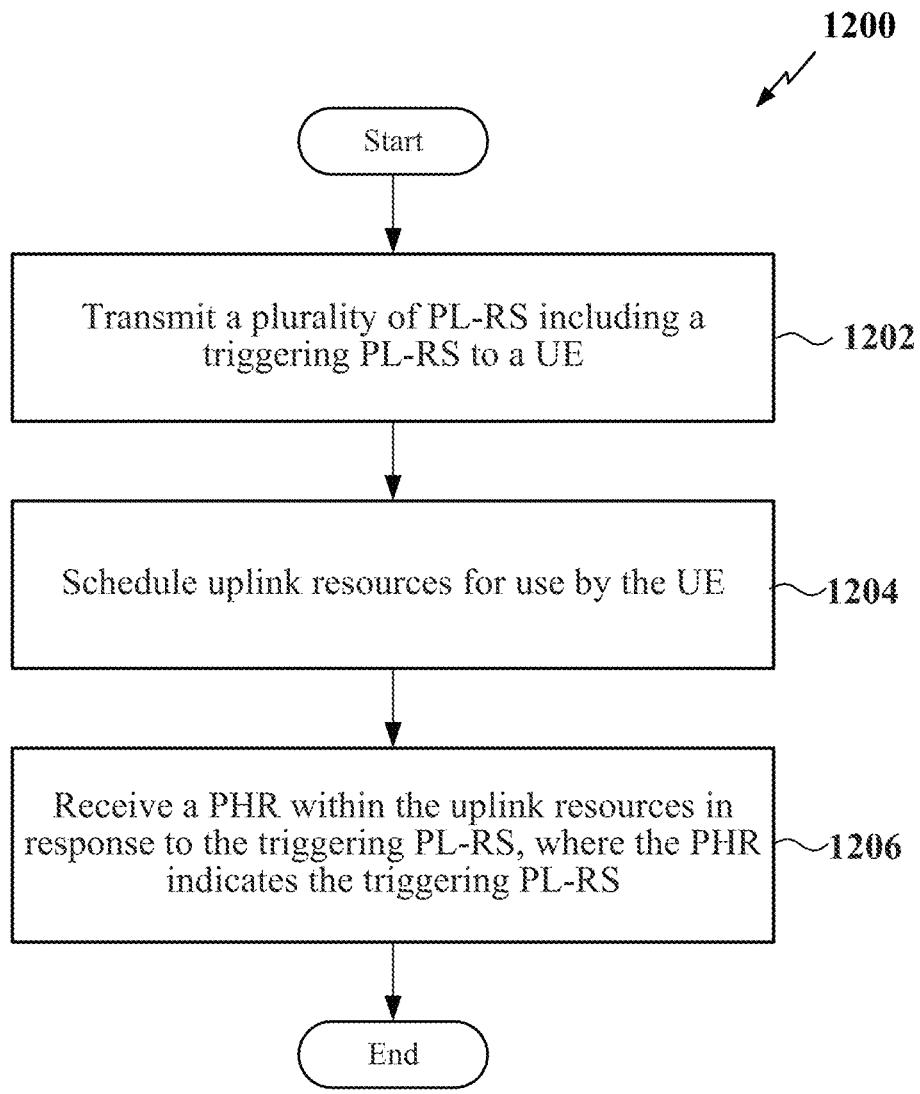
FIG. 12 is a flow chart illustrating an exemplary process for transmitting a triggering PL-RS and receiving a corresponding PHR according to some aspects.

FIG. 12 is a flow chart illustrating an exemplary process 1200 for transmitting a triggering PL-RS and receiving a corresponding PHR in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 700 illustrated in FIG. 7. In some examples, the process 1200 may be carried out by any suitable apparatus or means for carrying out the functions or algorithm described below.

At block 1202, the scheduling entity may transmit a plurality of PL-R, including a triggering PL-RS, to a scheduled entity. In some examples, each of the PL-RS may be associated with a different beam/path, where each beam/path is associated with a particular transmission reception point (TRP) of the scheduling entity. For example, the communication and processing circuitry 744 and the transceiver 710 shown and described above in connection with FIG. 7 may transmit the triggering PL-RS to the scheduled entity.

At block 1204, the scheduling entity may schedule UL resources that may be utilized for communication of the PHR by the scheduled entity. In some examples, the UL resources may be scheduled via an uplink (UL) grant or via semi-static or semi-persistent scheduling. The UL grant (or semi-static/semi-persistent scheduling) may include UL transmission parameters (e.g., TCI state) of the scheduled UL transmission that relate it to a given PL-RS. For example, the resource assignment and scheduling circuitry 742, communication and processing circuitry 744 and the transceiver 710 shown and described above in connection with FIG. 7 may schedule and transmit the UL grant to the scheduled entity.

At block 1206, the scheduling entity may receive a PHR in response to the triggering PL-RS within the UL resources, where the PHR indicates the triggering PL-RS. In some examples, the UL resources are quasi-co-located (QCLd) with the triggering PL-RS, and as such, the PHR may exclude information associated with the triggering PL-RS. In other examples, the UL resources are not QCLd with the triggering PL-RS. In this example, the PHR may include information associated with the triggering PL-RS. For example, the information may include a first index of the triggering PL-RS. The information may further include a second index of the serving cell corresponding to the triggering PL-RS and/or a power headroom value corresponding to the triggering PL-RS. For example, the communication and processing circuitry 744, PHR processing circuitry 746 and the transceiver 710, shown and described above in connection with FIG. 7 may receive the PHR.

In one configuration, a scheduling entity configured for wireless communication includes means for transmitting a plurality of path loss reference signals (PL-RS) including a triggering PL-RS to a user equipment (UE), means for transmitting an uplink grant of uplink resources to the UE, and means for receiving a power headroom report (PHR) in response to the triggering PL-RS, where the PHR indicates the triggering PL-RS. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 4, and/or 7, and utilizing, for example, the processes and/or algorithms described herein in relation to FIG. 12.

In another configuration, a scheduled entity configured for wireless communication includes means for measuring a path loss based on a triggering path loss reference signal (PL-RS) of a plurality of PL-RS, means for triggering generation of a power headroom report (PHR) based on the path loss, means for receiving an uplink grant of uplink resources, and means for transmitting the PHR utilizing the uplink resources, where the PHR indicates the triggering PL-RS. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, 4, and/or 8, and utilizing, for example, the processes and/or algorithms described herein in relation to FIGS. 9-11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 7, and/or 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduled entity, comprising:
   measuring a path loss based on a triggering path loss reference signal (PL-RS) of a plurality of PL-RS;
   triggering generation of a power headroom report (PHR) based on the path loss;
   identifying uplink resources for communication of the PHR to a scheduling entity;
   determining whether the uplink resources are quasi-co-located (QCLd) with the triggering PL-RS; and
   transmitting the PHR over the uplink resources, wherein the PHR indicates the triggering PL-RS, wherein the PHR comprises information associated with the triggering PL-RS when the uplink resources are not QCLd with the triggering PL-RS, and wherein the PHR excludes the information associated with the triggering PL-RS when the uplink resources are QCLd with the triggering PL-RS.

2. The method of claim 1, wherein the information associated with the triggering PL-RS comprises a first index of the triggering PL-RS.

3. The method of claim 2, wherein the information associated with the triggering PL-RS further comprises at least one of a second index of a serving cell corresponding to the triggering PL-RS or a power headroom value corresponding to the triggering PL-RS.

4. The method of claim 2, further comprising:
   generating a medium access control (MAC) control element (CE) comprising the first index of the triggering PL-RS.

5. The method of claim 1, further comprising:
   receiving one or more parameters indicating whether the uplink resources are quasi-co-located (QCLd) with the triggering PL-RS.

6. The method of claim 5, wherein the one or more parameters comprises a transmission configuration indicator (TCI) state.

7. The method of claim 1, wherein triggering generation of the PHR further comprises:
   triggering generation of the PHR when a change in the path loss is greater than a threshold value.

8. The method of claim 1, further comprising:
   receiving at least one previous uplink grant of additional uplink resources; and
   preventing the scheduled entity from utilizing the additional uplink resources to transmit the PHR when the additional uplink resources are not QCLd with the triggering PL-RS.

9. A scheduled entity configured for wireless communication, comprising:
   a processor;
   a transceiver communicatively coupled to the processor; and
   a memory communicatively coupled to the processor, wherein the processor is configured to:
      measure a path loss based on a triggering path loss reference signal (PL-RS) of a plurality of PL-RS;
      trigger generation of a power headroom report (PHR) based on the path loss;
      identify uplink resources for communication of the PHR to a scheduling entity;
      determine whether the uplink resources are quasi-co-located (QCLd) with the triggering PL-RS; and
      transmit the PHR over the uplink resources via the transceiver, wherein the PHR indicates the triggering PL-RS, wherein the PHR comprises information associated with the triggering PL-RS when the uplink resources are not QCLd with the triggering PL-RS, and wherein the PHR excludes the information associated with the triggering PL-RS when the uplink resources are QCLd with the triggering PL-RS.

10. The scheduled entity of claim 9, wherein the information associated with the triggering PL-RS comprises a first index of the triggering PL-RS.

11. The scheduled entity of claim 10, wherein the information associated with the triggering PL-RS further comprises at least one of a second index of a serving cell corresponding to the triggering PL-RS or a power headroom value corresponding to the triggering PL-RS.

12. The scheduled entity of claim 10, wherein the processor is further configured to:

generate a medium access control (MAC) control element (CE) comprising the first index of the triggering PL-RS.

13. The scheduled entity of claim 9, wherein the processor is further configured to:
receive one or more parameters indicating whether the uplink resources are quasi-co-located (QCLd) with the triggering PL-RS.

14. The scheduled entity of claim 13, wherein the one or more parameters comprises a transmission configuration indicator (TCI) state.

15. The scheduled entity of claim 9, wherein the processor is further configured to:
trigger generation of the PHR when a change in the path loss is greater than a threshold value.

16. The scheduled entity of claim 9, wherein the processor is further configured to:
receive at least one previous uplink grant of additional uplink resources; and
prevent the scheduled entity from utilizing the additional uplink resources to transmit the PHR when the additional uplink resources are not QCLd with the triggering PL-RS.

17. A method of wireless communication at a scheduling entity, comprising:
transmitting a plurality of path loss reference signals (PL-RS) comprising a triggering PL-RS to a user equipment (UE);
scheduling uplink resources for use by the scheduling entity; and
receiving a power headroom report (PHR) over the uplink resources in response to the triggering PL-RS, wherein the PHR indicates the triggering PL-RS, wherein the PHR comprises information associated with the triggering PL-RS when the uplink resources are not quasi-co-located (QCLd) with the triggering PL-RS, and wherein the PHR excludes the information associated with the triggering PL-RS when the uplink resources are QCLd with the triggering PL-RS.

18. The method of claim 17, wherein the information associated with the triggering PL-RS comprises a first index of the triggering PL-RS.

19. The method of claim 18, wherein the information associated with the triggering PL-RS further comprises at least one of a second index configured to identify a serving cell corresponding to the triggering PL-RS or a power headroom value corresponding to the triggering PL-RS.

20. The method of claim 18, wherein the PHC comprises a medium access control (MAC) control element (CE) comprising the first index of the triggering PL-RS.

21. The method of claim 17, further comprising:
transmitting one or more parameters indicating whether the uplink resources are quasi-co-located (QCLd) with the triggering PL-RS.

22. The method of claim 21, wherein the one or more parameters comprises a transmission configuration indicator (TCI) state.

23. A scheduling entity configured for wireless communication, comprising:
a processor;
a transceiver communicatively coupled to the processor; and
a memory communicatively coupled to the processor, wherein the processor is configured to:
transmit a plurality of path loss reference signals (PL-RS) comprising a triggering PL-RS to a user equipment (UE) via the transceiver;
schedule uplink resources for use by the scheduling entity; and
receive a power headroom report (PHR) within the uplink resources in response to the triggering PL-RS, wherein the PHR indicates the triggering PL-RS, wherein the PHR comprises information associated with the triggering PL-RS when the uplink resources are not quasi-co-located (QCLd) with the triggering PL-RS, and wherein the PHR excludes the information associated with the triggering PL-RS when the uplink resources are QCLd with the triggering PL-RS.

24. The scheduling entity of claim 23, wherein the information associated with the triggering PL-RS comprises a first index of the triggering PL-RS and further comprises at least one of a second index configured to identify a serving cell corresponding to the triggering PL-RS or a power headroom value corresponding to the triggering PL-RS.

* * * * *